R. A. COWELL.

Improvement in Railway Car Platforms.

No. 4,846. Reissued April 2, 1872.

Witnesses.
C. F. Brown
Melville Lehmuh

Inventor.
R. A. Cowell.
By Hill & Ellsworth
His Attorneys

UNITED STATES PATENT OFFICE.

RENSSELAER A. COWELL, OF CLEVELAND, OHIO.

IMPROVEMENT IN RAILWAY-CAR PLATFORMS.

Specification forming part of Letters Patent No. 110,901, dated January 10, 1871; reissue No. 4,846, dated April 2, 1872.

*To all whom it may concern:*

Be it known that I, RENSSELAER A. COWELL, of Cleveland, in the county of Cuyahoga and State of Ohio, have invented a new and useful Improvement in Railway Cars; and I do hereby declare the following to be a full, clear, and exact description of the same, reference being had to the accompanying drawing forming part of this specification, in which—

Figure 1:
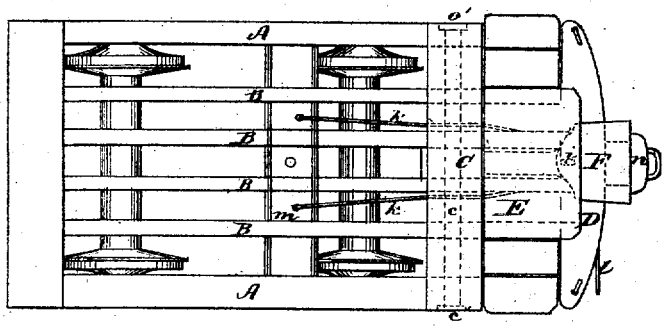
Figure 2:
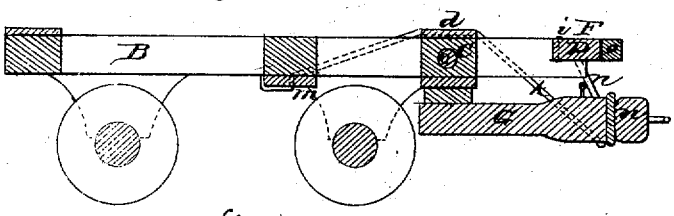
Figure 3:
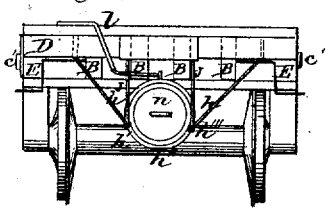

Figure 1 is a plan view. Fig. 2 is a longitudinal section, and Fig. 3 is an end view.

Similar letters of reference in the accompanying drawing denote the same parts.

My invention has for its object to improve the construction of railway cars, whereby they are rendered stronger and safer than those in common use. To this end the invention consists, first, in the means employed for suspending the draw-heads of the car beneath the projecting platforms, whereby such draw-heads are prevented from lateral or vertical displacement by the violent contact of adjoining cars. The invention consists, secondly, in providing each end platform of the car with a supplemental platform, so that when two cars are coupled together the space between them, over the coupling and draw-heads, shall be closed by a continuous flooring extending from one end platform to the other. Two adjoining supplemental platforms are held in contact by a yielding pressure, so as to preserve such contact and at the same time conform to the independent movements, longitudinally and laterally, of their respective cars. The invention consists, finally, in the employment of a coupling-link, to which is secured an India-rubber buffer or bumper, in connection with the suspended draw-heads and the end and supplemental platforms. Inasmuch as the outer end of a draw-head is in the same, or nearly the same, vertical plane as the outer end of the platform immediately over it, both together receive the shock incident to the contact of two cars and act together in resisting the force of the blow. In order to secure the advantages incident to the use of a yielding buffer and at the same time retain the relative position of the draw-heads with respect to their platforms, I employ a block of India rubber secured to the center of the coupling-link itself. By this means a yielding buffer is formed between two draw-heads, which absorbs the shock of two cars coming together without injuring the end platforms by violent concussions.

In the drawing, A A represent the two side rails of the base or platform of a car, and B B are intermediate rails, all lying lengthwise of the car, the side rails A A being shorter and terminating at the end of the house or body of the car, while the intermediate rails B B are longer and extend beyond the body of the car to form the platform. The end sill C, forming the end of the car proper, is made by square blocks fitted between the rails B B, and having a strong bolt, *c*, passing through them and the rails and secured by nuts *c'* on the outside face of the side rails A A. There are also heavy planks *d d* placed across, one on the upper side and one on the under side of the blocks and rails, and secured together by bolts. This makes the end of the frame quite as strong as the sides and allows the rails B B to extend beyond, for reasons hereinafter shown. Across the ends of the rails B B is a cross-head, D. The floor and steps of the platform are made of a plate of sheet boiler-iron, E, bent to form the steps, and roughened on the upper side so as not to be slippery. F is the supplemental platform, composed of one or more pieces of metal and formed so as to embrace the cross-head D, as shown in Fig. 2, its upper side slipping under the floor-plate E. The upper and lower sides of this platform near the inner edge are formed with slots *f*, to accommodate a bolt, *i*, passing through the cross-head. The platform F extends out beyond the cross-head a short distance, and the space between its outer end and the cross-head D is occupied by a rubber spring, *o*, which acts to keep the platform extended, and will also allow it to turn sidewise a little, so as to keep it in contact with the platform of the opposite car when the train is passing a curve. This platform F is as wide as the space between the hand-rails of the end platform, and the two (one on each car) meet and cover the space usually formed between the cars. The draw-head G is secured at its rear end in the usual manner, but the front end I secure by braces, as follows: A heavy iron rod, *h*, is bent, as seen in Fig. 3, and nearly embraces the draw-head, the ends being secured in the ends of the cross-head D. A bar, *h'*, under the draw-head unites with the braces at $h''$ $h'''$, and thus secures the draw-head firmly in place. The two studs $j$ $j$, extending from the joints $h''$ $h'''$ to the cross-head D, prevent the draw-head from being forced upward. There are also two strong iron braces, K K, which pass from $h''$ and $h'''$, at the front of the draw-head, back over the sill C to a transom, $m$, to both of which they are firmly secured. By this mode of constructing a platform greater strength is obtained. By having the rails B B extend out to the cross-head D or front end of the platform, and by having the platform, floor, and steps of iron and the brace-rods K K combined, as shown, the liability of the cars breaking into each other, or telescoping, as it is termed, in case of collision, is overcome, as the timbers forming the base or foundation would come in contact directly, end to end. The supplemental platforms of two contiguous cars also touch each other at all times, so that the space between two cars is always closed. The point of meeting of the two extension platforms is over the central part of a rubber-block, $n$, secured to the coupling-link between the two draw-heads, as shown. By this arrangement the rubber block $n$ forms a yielding buffer between two draw-heads, as previously described, to absorb the force of a blow incident to the contact of two cars, and at the same time prevents injury to the end platforms.

The draw-heads or couplings, as well as the links, having India-rubber blocks, which I design to use with my improved end and supplemental platforms, form the subject of a patent heretofore granted to me.

The devices for forming a continuous floor from one car to the other, in connection with the coupling, is designed to apply to the platform of old cars as well as to those herein described.

Having thus described my invention, what I claim is—

1. The draw-head G, combined with the end platform of the car, and suspended beneath the same by means of the brace-rods $h$, connecting-bar $h'$, and upright supports $j$, substantially as described, for the purposes specified.

2. In combination with the rigid end platform of a railway car, I claim a supplemental yielding platform projecting outward beyond such rigid platform, and adapted to swing laterally, substantially as described, for the purposes specified.

3. Uniting the adjoining platforms of two railway cars, so as to form a continuous floor, by means of yielding supplemental platforms F, which are adapted to swing laterally to preserve their contact when the cars are passing a curve, substantially as described.

4. The employment of the coupling-link having the India-rubber buffer $n$, in connection with the rigid end platforms, the draw-heads G, and the supplemental platforms F, substantially as described, for the purposes specified.

R. A. COWELL.

Witnesses:
E. A. ELLSWORTH,
MELVILLE CHURCH.